Oct. 29, 1935.  W. ENDRES  2,018,914
INTERNAL COMBUSTION ENGINE
Original Filed July 24, 1930
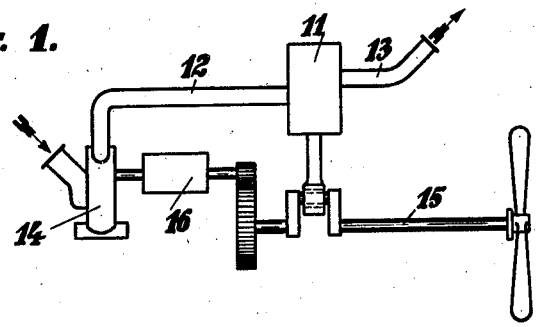
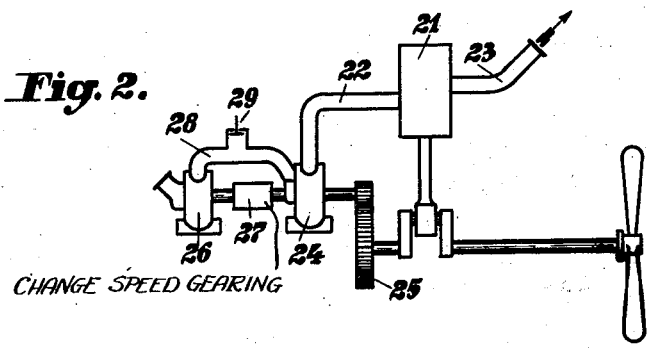
Inventor
Wilhelm Endres
by Maréchal & Noé
attorneys Patented Oct. 29, 1935

2,018,914

UNITED STATES PATENT OFFICE 2,018,914

INTERNAL COMBUSTION ENGINE

Wilhelm Endres, Danzig-Langfuhr, Free City of Danzig, assignor to Maschinenfabrik Augsburg-Nürnberg A.-G., Augsburg, Germany, a corporation of Germany Original application July 24, 1930, Serial No. 470,291. Divided and this application September 10, 1934, Serial No. 743,390. In Germany July 29, 1929

2 Claims. (Cl. 123—119)

This invention relates to internal combustion engines of the type operating with air scavenging, and more particularly to engines of this character adapted for use in aircraft.

One object of the invention is the provision of an aircraft engine, operating with air scavenging, the supply of scavenging air to the engine being substantially constant at various elevations.

Other objects and advantages of the invention will be apparent from the following description, the appended claims, and the accompanying drawing, in which—

Fig. 1 is a diagrammatic view of an aircraft engine embodying the present invention, the scavenging air blower for the engine having a variable speed drive; and Fig. 2 is a view of a modified form of the invention, in which an auxiliary blower is adapted to supply air to the main scavenging air blower.

This application is a division of application Serial No. 470,291, filed July 24, 1930.

Internal combustion engines of the customary construction, having air scavenging, do not operate at full efficiency when the surrounding air is at less than atmospheric pressure, since the amount of air charged in the cylinders is decreased under such conditions. When aircraft are powered by engines operating with scavenging air, in accordance with this invention, means are provided for maintaining the scavenging air flow from a scavenging air pump at a substantially definite pressure so that the aircraft engine may operate efficiently when at high elevations.

Referring to the accompanying drawing, in which preferred embodiments of the invention are illustrated, and first with reference to Fig. 1, 11 designates an internal combustion engine forming the power unit of an aircraft. Preferably the engine is of the two cycle double acting Diesel type. It is shown connected to the propeller shaft 15. Connected to the engine cylinder or cylinders is a scavenging pipe 12 through which scavenging air is supplied so as to scavenge burnt gases and to charge the cylinder with a supply of free air into which the fuel may be introduced. The exhaust gases flow out through the exhaust pipe 13.

A supply of scavenging air is created by the scavenging air blower 14, which may be of the turbine type, or of the positive displacement type. This blower receives air from the exterior and supplies it to the scavenging air ports of the engine cylinder, at some definite predetermined pressure. The blower is connected by suitable gearing, as shown, to the main shaft 15, and is adapted to operate, under ordinary conditions, at a speed considerably in excess of the engine speed.

Interposed in the geared connection between the blower 14 and the engine shaft 15 is a variable speed transmission, designated 16, and embodying manually selectable gear trains so that the speed of the blower with relation to the engine may be varied by successive steps, in order to provide for a blower speed which is sufficient to supply air at the proper pressure for scavenging the burnt gases and for charging the engine cylinder with fresh air.

When operating at the ground level, or at small distances from the ground, the aircraft engine operates at a high efficiency as it receives the full charge of air intended, the size and the speed of the blower 14 being so coordinated with the scavenging air requirements as to produce efficient operation of the engine. When the aircraft is at high elevations, however, if the speed of the blower was constant, it would fail to supply sufficient air to the engine cylinder and a loss of efficiency and a decrease in power would result. By means of the variable transmission gearing 16, however, the speed ratio of the blower 14 may be increased so that the scavenging air supplied to the cylinder is at the proper predetermined pressure, substantially the same as the pressure required at ground levels or under the ordinary atmospheric pressure conditions.

The arrangement as shown in Fig. 1 is especially adapted for use on the smaller powered engines, for with smaller powered engines the gear system by which the blower is driven would not be unduly large and heavy. Where the engine is of large size, and the power required for driving the blower is very substantial, an arrangement such as is shown in Fig. 2 may be employed. Here the engine 21, preferably of the two cycle Diesel type, has its scavenging air pipe 22 connected to the main scavenging air blower 24, the exhaust from the engine flowing through the exhaust pipe 23 to atmosphere. The blower 24 is geared to the engine shaft by suitable gearing 25 to supply scavenging air to the engine at the desired pressure. An auxiliary blower 26 is driven from the shaft of the blower 24 through a change speed gearing transmission 27. A pipe 28 extends from the outlet side of the auxiliary blower 26 to the suction side of the blower 24, and this pipe is provided with an inlet check valve 29 through which air may be drawn from the exterior, the valve 29 being adapted to close automatically when the pressure within the pipe 28 exceeds the outside pressure. At the ground level, and at low flying elevations, the drive 27 is maintained in neutral so that the blower 26 is inoperative, air being drawn to the scavenging air blower 24 through the check valve 29 or through the blower 26 if the latter is of the turbine type.

The size of the blower 24, and its speed of operation are such that the desired pressure of the scavenging air flow to the engine is obtained for satisfactory and economical operation under normal air pressure conditions or at ground level, and with the auxiliary blower 26 idle. When operating at higher altitudes, the blower 26 may be operated at a suitable speed so that air is drawn from the exterior and supplied by this auxiliary blower at substantially normal atmospheric pressure, this air being then drawn in by main blower 24 to be supplied at the proper predetermined pressure to the engine cylinder or cylinders. As the power required for driving the auxiliary blower is comparatively small as compared with the power required for driving the main blower 24, the selective speed transmission 27 may be quite small and compact. It will be apparent that as long as the auxiliary blower supplies air to the main blower 24 at normal atmospheric pressure, or at about 14.7 pounds per square inch, the proper predetermined pressure of the scavenging air supplied to the engine will obtain, and the engine will operate at its normal efficiency and with normal air charges. The number of different speeds that may be obtained through the selective gear transmission 27 may be such as to satisfy varying requirements, and in some cases an ordinary coupling between the shaft of the blower 26 and the shaft of the blower 24 may be sufficient to provide a satisfactory supply of scavenging air to the engine cylinder at the higher altitudes.

The embodiments of the invention shown in Figs. 1 and 2 are preferably provided with devices such as a control throttle in the exhaust line of the engine to provide for maximum loading or charging of air in the cylinder after the ordinary scavenging cycle ceases. In this way the pressure of the air charge in the cylinder may reach the desired degree at the beginning of the compression stroke. Such throttles are not shown as their details form no part of the present invention.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a power system for aircraft, an internal combustion engine operating with air scavenging, a scavenging air blower operatively connected to the engine shaft to provide a scavenging air flow to the engine at a definite pressure when operating under normal atmospheric pressure conditions, and a variable speed blower for supplying air to said scavenging air blower at substantially normal atmospheric pressure, and a variable speed transmission between said blowers.

2. In a power system for aircraft, an internal combustion engine operating with air scavenging, a scavenging air blower providing a scavenging air flow to the engine at a definite pressure when operating under normal atmospheric pressure conditions, a variable speed blower driven by said scavenging air blower for supplying air to said scavenging air blower at substantially normal atmospheric pressure regardless of the elevation of the aircraft, and a variable speed transmission between said blowers.

WILHELM ENDRES.